US012706993B2

(12) United States Patent
Ye et al.

(10) Patent No.: US 12,706,993 B2
(45) Date of Patent: Aug. 11, 2026

(54) POWER MANAGEMENT METHOD, TERMINAL, AND STORAGE MEDIUM

(71) Applicant: Honor Device Co., Ltd., Shenzhen (CN)

(72) Inventors: Chunhui Ye, Shenzhen (CN); Liang Liu, Shenzhen (CN); Cheng Jiang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 531 days.

(21) Appl. No.: 18/279,535

(22) PCT Filed: May 9, 2022

(86) PCT No.: PCT/CN2022/091792
§ 371 (c)(1),
(2) Date: Aug. 30, 2023

(87) PCT Pub. No.: WO2023/020027
PCT Pub. Date: Feb. 23, 2023

(65) Prior Publication Data
US 2024/0146831 A1 May 2, 2024

(30) Foreign Application Priority Data
Aug. 16, 2021 (CN) ........................ 202110937634.X

(51) Int. Cl.
*H04M 1/02* (2006.01)
*H04W 52/28* (2009.01)

(52) U.S. Cl.
CPC ....... *H04M 1/0243* (2013.01); *H04M 1/0214* (2013.01); *H04W 52/28* (2013.01); *H04M 2250/12* (2013.01); *H04M 2250/16* (2013.01)

(58) Field of Classification Search
CPC ............. H04M 1/0243; H04M 1/0214; H04M 2250/12; H04W 52/28; H04W 52/288; H04W 52/367
See application file for complete search history.

(56) References Cited

U.S. PATENT DOCUMENTS 10,013,038 B2 7/2018 Mercer et al.
10,785,731 B2 9/2020 Wu
(Continued)

FOREIGN PATENT DOCUMENTS

CN 104853426 A 8/2015
CN 108174024 A 6/2018
(Continued)

*Primary Examiner* — Lewis G West
(74) *Attorney, Agent, or Firm* — Slater Matsil, LLP

(57) ABSTRACT

The implementation of this application provides a power management method, a terminal. The method includes: obtaining a configuration change signal of a terminal device in response to a configuration change of the terminal device; obtaining an output power level truth table of the terminal device based on the configuration change signal of the terminal device, where the output power level truth table includes a configuration of the terminal device and a power level and a fallback power of the terminal device in the configuration; obtaining the power level and the fallback power of the terminal device based on the output power level truth table; setting an output power of the terminal device based on the fallback power of the terminal device, and outputting a corresponding power value based on the power level.

20 Claims, 6 Drawing Sheets

(56) References Cited

U.S. PATENT DOCUMENTS

| | | | | |
|---|---|---|---|---|
| 11,070,279 | B2 | 7/2021 | Raghavan et al. | |
| 11,147,026 | B2 | 10/2021 | Lee et al. | |
| 11,201,635 | B2 | 12/2021 | Chu et al. | |
| 11,265,821 | B2 | 3/2022 | Maki | |
| 2016/0117948 | A1 | 4/2016 | Kraemer et al. | |
| 2017/0192478 | A1* | 7/2017 | Mercer | G01D 5/142 |
| 2019/0215765 | A1* | 7/2019 | Ramasamy | H04W 52/0206 |
| 2019/0273525 | A1* | 9/2019 | Wu | H04W 52/30 |
| 2020/0059867 | A1 | 2/2020 | Haghighat et al. | |
| 2020/0136668 | A1* | 4/2020 | Chu | G06F 1/1616 |
| 2021/0185621 | A1* | 6/2021 | Krenz | H04W 52/367 |
| 2021/0409531 | A1* | 12/2021 | Shim | H04N 23/53 |
| 2023/0085568 | A1* | 3/2023 | Jin | G06F 1/1677 455/575.1 |
| 2024/0098654 | A1* | 3/2024 | Bertizzolo | H04W 52/267 |

FOREIGN PATENT DOCUMENTS

| | | | |
|---|---|---|---|
| CN | 108370084 | A | 8/2018 |
| CN | 108494961 | A | 9/2018 |
| CN | 108777744 | A | 11/2018 |
| CN | 109891953 | A | 6/2019 |
| CN | 109982423 | A | 7/2019 |
| CN | 110401473 | A | 11/2019 |
| CN | 111124040 | A | 5/2020 |
| CN | 111817741 | A | 10/2020 |
| CN | 112492668 | A | 3/2021 |
| CN | 113163435 | A | 7/2021 |
| CN | 113169769 | A | 7/2021 |
| CN | 113825224 | A | 12/2021 |
| DE | 102020131184 | A1 | 6/2021 |
| EP | 3671948 | A2 | 6/2020 |
| WO | 2020093394 | A1 | 5/2020 |

* cited by examiner

POWER MANAGEMENT METHOD, TERMINAL, AND STORAGE MEDIUM

CROSS-REFERENCE TO RELATED APPLICATIONS

This application is a national stage of International Application No. PCT/CN2022/091792, filed on May 9, 2022, which claims priority to Chinese Patent Application No. 202110937634.X, filed on Aug. 16, 2021. The disclosures of both of the aforementioned applications are hereby incorporated by reference in their entireties.

TECHNICAL FIELD

This application relates to the field of communications technologies, and in particular, to a power management method, a terminal, and a storage medium.

BACKGROUND

In response to the development of communications technologies, wireless communication technology is more and more widely used in a terminal device. When performing wireless communication, a certain amount of electromagnetic radiation is generated. If the power of the electromagnetic radiation is too large, damage to the body of a user may be caused. Therefore, national ministries and commissions such as the Ministry of Industry and Information Technology, as well as international organizations such as the Institute of Electrical and Electronics Engineers (Institute of Electrical and Electronics Engineers, IEEE) and the 3rd Generation Partnership Project (3rd Generation Partnership Project, 3GPP), formulate relevant regulations on the relevant transmission power of the terminal device for the wireless communication. As a result, the power of the terminal device in use needs to meet the restrictions of relevant regulations, that is, the power of the terminal device is not greater than z maximum safety limit stipulated by the regulations.

Currently, a plurality of terminal devices support a variety of configuration change, such as a mobile phone, a tablet computer, a portable laptop, a virtual\mixed\augmented reality device, a navigation device, and another device. When the configuration of the terminal device changes, an actual antenna gain and a radiation range also changes. When the configuration change of the terminal device changes, the antenna gain is not adjusted, so it is impossible to optimize a total radiated power (Total Radiated Power, TRP) of the terminal device under a condition of meeting regulatory restrictions.

SUMMARY

Based on the above, a power management method, a terminal, and a storage medium are necessarily to be provided.

According to a first aspect, an implementation of this application provides a power management method applicable to a foldable terminal device, including:

- obtaining a configuration change signal of a terminal device in response to a configuration change of the terminal device;
- obtaining an output power level truth table of the terminal device based on the configuration change signal of the terminal device, where the output power level truth table includes a configuration of the terminal device and a power level and a fallback power of the terminal device in the configuration;
- obtaining the power level and the fallback power of the terminal device based on the output power level truth table;
- setting an output power of the terminal device based on the fallback power of the terminal device, where the output power is a maximum power that meets regulatory requirements in a current configuration; and
- outputting a corresponding power value based on the power level.

According to a second aspect, an implementation of this application provides a power management method applicable to a foldable terminal device, including:

- obtaining an angle of a terminal device in response to an angle change between a main screen and a secondary screen of the terminal device, and matching the angle of the terminal device to an angle interval;
- obtaining an output power level truth table of the terminal device based on the angle interval of the terminal device, where the output power level truth table includes the angle interval of the terminal device and a power level and a fallback power of the terminal device when the terminal device is in the angle interval;
- obtaining the power level and the fallback power of the terminal device based on the output power level truth table;
- setting an output power of the terminal device based on the fallback power of the terminal device, where the output power is a maximum power that meets regulatory requirements in a current configuration; and
- outputting a corresponding power value based on the power level of the terminal device.

According to a third aspect, an embodiment of this application provides a foldable terminal, including: one or more processors, coupled to one or more sensors, where

- the one or more sensors are configured to obtain an angle of the terminal and a configuration change of the terminal;
- the one or more processors are configured to, based on a configuration change signal of the terminal obtained by a first sensor, enable the terminal to perform the power management method according to the first aspect; and
- the one or more processors are further configured to, based on an angle interval of the terminal obtained by the one or more sensors, enable the terminal to perform the power management method according to the second aspect.

According to a fourth aspect, an implementation of this application provides a computer-readable storage medium. The computer-readable storage medium includes computer instructions. The computer instructions, when run on an electronic device, cause the electronic device to perform the power management method applicable to a foldable terminal device according to the first aspect; or

- perform the power management method applicable to a foldable terminal device according to the second aspect.

According to the power management method applicable to the foldable terminal device, the terminal device, and the storage medium provided by the implementation of this application, the antenna gain of the terminal device can be adjusted based on the configuration of the terminal device, and an actual antenna gain of the terminal device is optimized while satisfying relevant regulatory requirements.

Figure 1:
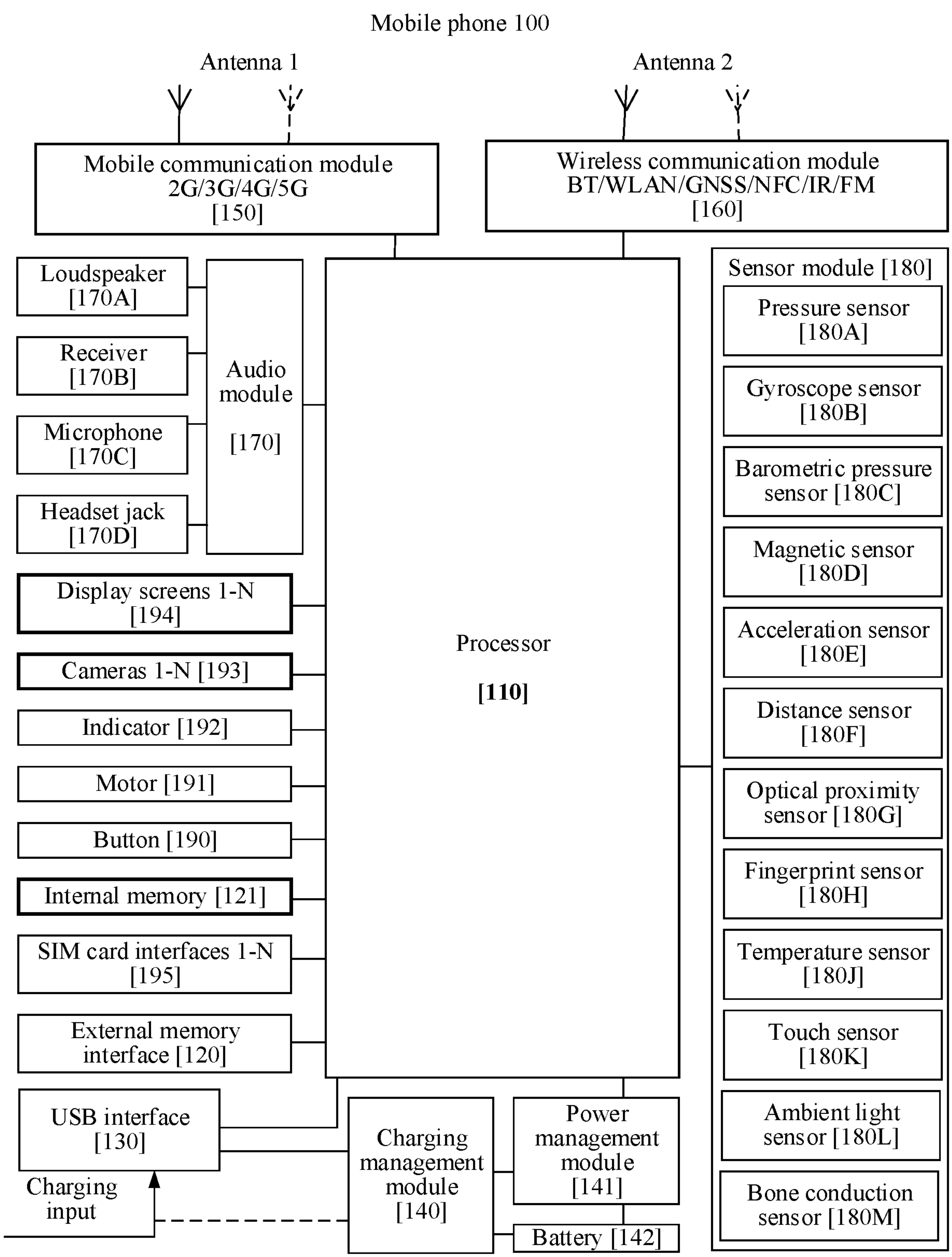
FIG. 1 is a schematic structural diagram of a mobile phone according to an embodiment of this application.

This application is further described in the following specific implementations with reference to the accompanying drawings.

DETAILED DESCRIPTION OF ILLUSTRATIVE EMBODIMENTS

The following clearly and completely describes the technical solutions in the implementations of this application with reference to the accompanying drawings in the implementations of this application. Apparently, the described implementations are merely some but not all of the implementations of this application.

It should be noted that in embodiments of this application, "at least one" refers to one or more, and "a plurality of" refers to two or more. Unless otherwise defined, all technical and scientific terms as used herein have the same meanings as those usually understood by a person skilled in the art of this application. The terms used in the specification of this application are merely intended to describe specific embodiments, but are not intended to limit this application.

It should be noted that in descriptions of embodiments of this application, terms such as "first" and "second" are merely used for distinguishing descriptions, and cannot be understood as an indication or implication of relative importance, or an indication or implication of a sequence. features defined by "first" and "second" may explicitly or implicitly include one or more of the features. In the descriptions of embodiments of this application, the words such as "for example" and "such as" are used to mean an example, an illustration, or a description. Any embodiment or design scheme described by using "exemplarily" or "for example" in embodiments of this application should not be explained as being more preferred or having more advantages than another embodiment or design scheme. In particular, the terms such as "exemplary" and "example" as used herein are intended to present the related concept in a specific implementation.

All other implementations obtained by a person of ordinary skill in the art based on the implementations of this application without creative efforts shall fall within the protection scope of this application.

In response to the development of communications technologies, wireless communication technology is more and more widely used in a terminal device. When performing wireless communication, a certain amount of electromagnetic radiation is generated. If the power of the electromagnetic radiation is too large, damage to the body of a user may be caused. Therefore, national ministries and commissions such as the Ministry of Industry and Information Technology, as well as international organizations such as the Institute of Electrical and Electronics Engineers (Institute of Electrical and Electronics Engineers, IEEE) and the 3rd Generation Partnership Project (3rd Generation Partnership Project, 3GPP), formulate relevant regulations on the relevant transmission power of the terminal device for the wireless communication. As a result, the power of the terminal device in use needs to meet the restrictions of relevant regulations, that is, the power of the terminal device is not greater than z maximum safety limit stipulated by the regulations.

Currently, a plurality of terminal devices support a variety of configuration changes. When the configuration of the terminal device changes, an actual antenna gain and a radiation range also changes. When the configuration change of the terminal device changes, the antenna gain is not adjusted, so it is impossible to achieve a maximum power spectral density while meeting regulatory restrictions.

Based on the foregoing problems, embodiments of this application provide a power management method applicable to a foldable terminal device, a terminal device, and a storage medium. The antenna gain of the terminal device can be adjusted based on the configuration of the terminal device. An actual antenna gain of the terminal device is optimized while satisfying relevant regulatory requirements.

Some implementations of this application are described below in detail with reference to the accompanying drawings. The following embodiments and features in the embodiments may be mutually combined in a case that no conflict occurs.

FIG. 1 is a schematic structural diagram of a mobile phone according to an embodiment of this application. Although FIG. 1 takes a mobile phone as an example to illustrate a structure of an electronic device, a person skilled in the art should understand that the structure of the mobile phone in FIG. 1 is also applicable to another electronic device that has a camera and support mode switching. As shown in FIG. 1, the mobile phone 100 may include a processor 110, an external memory interface 120, an internal memory 121, a USB interface 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the structures illustrated in embodiments of this application do not constitute a specific limitation on the mobile phone 100. In some other embodiments of this application, the mobile phone 100 may include more or fewer components than those shown in the figure, or some components may be combined, or some components may be split, or components are arranged in different manners. The components shown in the figure may be implemented by hardware, software or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

The controller may generate an operation control signal according to instruction operation code and a time-sequence signal, and control obtaining and executing of instructions.

A memory may also be arranged in the processor 110, and is configured to store instructions and data. In some embodiments, the memory in the processor 110 is a cache memory. The memory may store instructions or data that have just been used or recycled by the processor 110. If the processor 110 needs to use the instructions or the data again, the processor may directly call the instructions or the data from the memory. Therefore, repeated access is avoided, a waiting time of the processor 110 is shortened, and system efficiency is improved.

The USB interface 130 is an interface that conforms to the USB standard specification, and may be specifically a Mini USB interface, a Micro USB interface, a USB Type C interface, or the like, which can support various USB specifications including USB1.0, USB2.0, USB3.0 and USB4.0 or higher standard USB specifications. For example, the USB interface 130 may include one or more USB interfaces.

Moreover, the processor 110 is further configured to obtain instructions for implementing a power management method provided in embodiments of this application, and obtain, from a sensor, a state (a folded state or an unfolded state) of the corresponding mobile phone 100 or an unfolding angle of the mobile phone 100 to implement the power management method for the mobile phone 100.

Moreover, it may be understood that a schematic interface connection relationship between the modules in this embodiment is merely an example for description, and constitutes no limitation on the structure of the mobile phone 100. In some other embodiments of this application, the mobile phone 100 may also adopt an interface connection manner different from that in the foregoing embodiment, or adopt a combination of a plurality of interface connection manners.

The charging management module 140 is configured to receive a charging input from a charger. The power management module 141 is configured to be connected to the battery 142, the charging management module 140, and the processor 110. A wireless communication function of the mobile phone 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used with a tuning switch.

The mobile communication module 150 may provide a solution to wireless communication such as 2G/3G/4G/5G applied to the mobile phone 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and send the electromagnetic wave to the modem processor for demodulation. The mobile communications module 150 may further amplify a signal modulated by the modem processor, and convert the signal into an electromagnetic wave by using the antenna 1 for radiation. In some embodiments, at least some functional modules of the mobile communication module 150 may be arranged in the processor 110. In some embodiments, at least some of the functional modules of the mobile communication module 150 may be arranged in a same device as at least some modules of the processor 110.

The wireless communication module 160 may provide solutions of wireless communications applied to the mobile phone 100, including a wireless local area network (wireless local area network, WLAN) (such as a wireless fidelity (wireless fidelity, Wi-Fi) network), bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more devices into which at least one communication processing module is integrated. The wireless communications module 160 receives an electromagnetic wave by using the antenna 2, performs frequency modulation on and filters the electromagnetic wave signal, and sends a processed signal to the processor 110. The wireless communications module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, the antenna 1 and the mobile communication module 150 of the mobile phone 100 are coupled, and the antenna 2 and the wireless communication module 160 of the mobile phone are coupled, so that the mobile phone 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS) and/or satellite based augmentation systems (satellite based augmentation systems, SBAS).

The mobile phone 100 may implement a photographing function through the ISP, the camera 193, the video codec, the GPU, the display screen 194, the application processor, and the like. The external memory interface 120 may be configured to connect to an external storage card such as a micro SD card, to extend a storage capability of the mobile phone 100. The external storage card communicates with the processor 110 by using the external memory interface 120, to implement a data storage function. For example, files such as music and a video are stored into the external storage card.

The mobile phone 100 may implement an audio function through the audio module 170, the loudspeaker 170A, the receiver 170B, the microphone 170C, the headset jack 170D, the application processor, and the like. The audio function includes, for example, music playing and sound recording.

Figure 2:
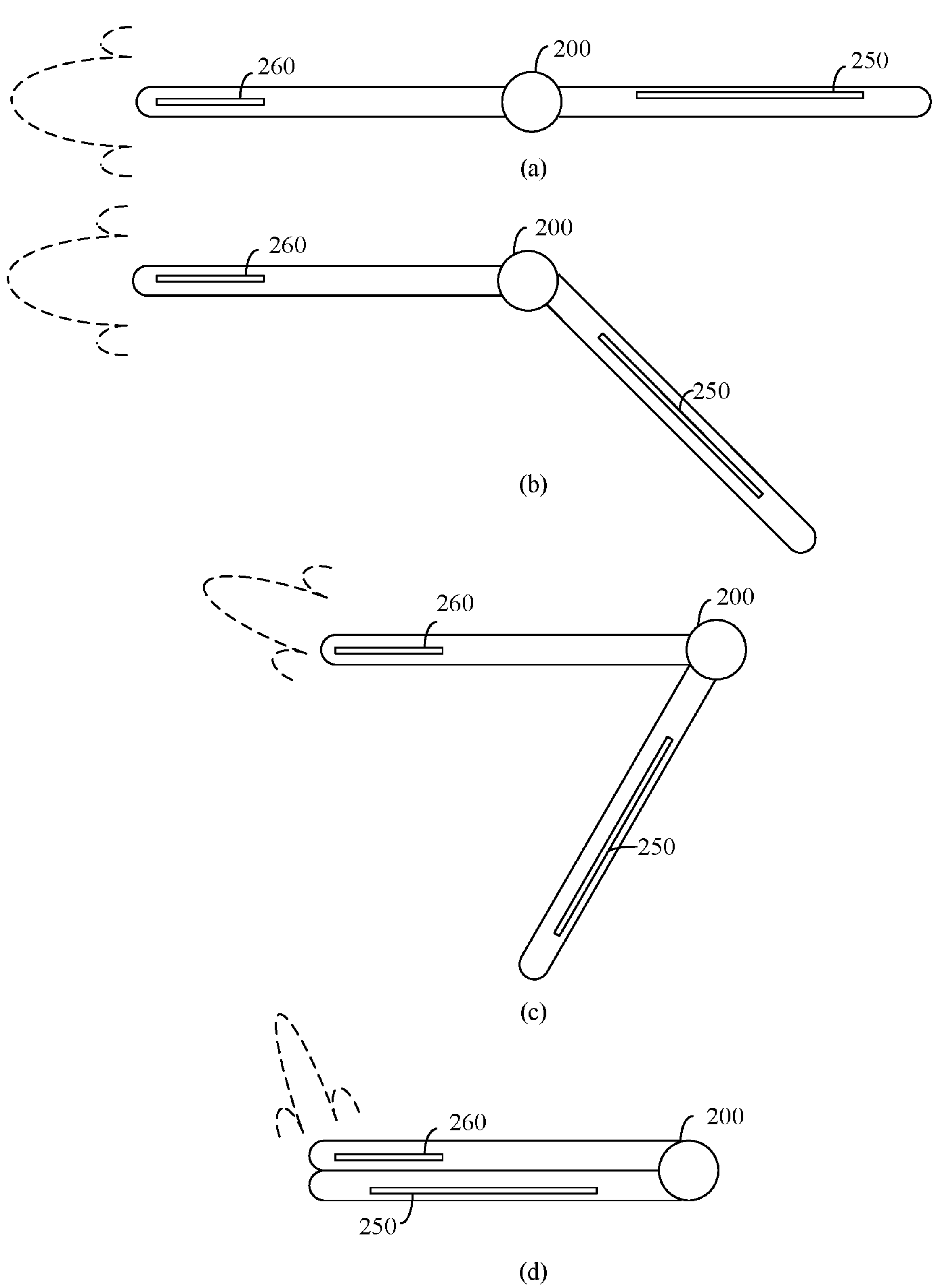
FIG. 2 is a schematic diagram of an antenna radiation direction of a terminal device according to an embodiment of this application.

FIG. 2 is a schematic diagram of an antenna radiation direction of a terminal device according to an embodiment of this application.

Referring to FIG. 2 together, FIG. 2 (*a*) shows a schematic diagram of the antenna radiation direction of the terminal device 200 in an unfolded state. FIG. 2 (*b*) shows a schematic diagram of the antenna radiation direction of the terminal device 200 at an unfolded angle of 135°. FIG. 2 (*c*) shows a schematic diagram of the antenna radiation direction of the terminal device 200 at an unfolded angle of 45°. FIG. 2 (*d*) shows a schematic diagram of the antenna radiation direction of the terminal device 200 in a folded state.

It may be understood that the terminal device 200 in FIG. 2 (*a*) to FIG. 2 (*d*) uses the same antenna 260. The dashed line indicates the antenna radiation direction of the terminal device 200. A beam with the largest radiation intensity is a main lobe, and a beam with a smaller radiation intensity is a side lobe. It may be understood that a narrower main lobe and a smaller side lobe in an antenna radiation pattern led to energy radiation of the antenna 260 be more concentrated, that is, gain (Gain, G) of the antenna 260 is high. Referring to FIG. 2 (*a*) to FIG. 2 (*d*) together, when the configuration of the terminal device 200 is converted from the unfolded state to the folded state, the main lobe in the antenna radiation pattern is narrowed and the side lobe is reduced, that is, the gain of the antenna 260 is gradually increased.

It may be understood that a metal plate 250 is generally arranged in the terminal device 200. For example, one or more metal plates 250 may be arranged on the terminal device 200 to achieve functions such as fixed elements, electromagnetic shielding, and wireless charging. Therefore, when the configuration of the terminal device 200 is converted from the unfolded state to the folded state, the metal plate 250 around the antenna 260 of the terminal device 200 can function as a reflective surface to change the radiation direction of the main lobe, and concentrate the energy located in the direction of the side lobe towards the main lobe, thereby improving the antenna gain G of the terminal device 200 in the radiation direction of the main lobe. As a result, when the configuration of the terminal device 200 is converted from the unfolded state to the folded state, the gain G of the antenna 260 is increased, while the radiation range of the antenna 260 is correspondingly reduced.

In combination with Table 1, parameters of the terminal device 200 in the folded state and the unfolded state are described below.

TABLE 1

| Parameters of the terminal device 200 in the folded state and the unfolded state | | | | | | | | | |
|---|---|---|---|---|---|---|---|---|---|
| Device configuration | $P_0$ | G | PSD | P1' | P | P + G | PSD − (P + G) | E | TRP |
| Folded state | 18 | 3 | 17 | −4 | 14 | 17 | 0 | −3 | 11 |
| Unfolded state | 18 | 1 | 17 | −4 | 14 | 15 | 2 | −3 | 11 |

As shown in Table 1, $P_0$ is a maximum power that the terminal device 200 can support, G is an antenna gain, PSD is an upper limit of a power spectral density (Power Spectral Density, PSD) specified by regulations, P1' is a fallback power, P is an actual power of the terminal device 200, P+G is an actual power spectral density, PSD−(P+G) is a margin between the actual power and the regulations, E is an antenna efficiency, and TRP is total radiated power (Total Radiated Power, TRP). It may be understood that units of the values in Table 1 are dB.

The power spectral density PSD generally satisfies the following formula (1).

$$PSD = P + G \tag{1}$$

That is to say, the power spectral density PSD is a sum of the actual power (P) of the terminal device 200 and the antenna gain (G). The power spectral density PSD shall be less than or equal to the maximum safety limit stipulated by the relevant regulations, that is, the mobile phone power P and antenna gain G shall be less than or equal to the maximum safety limit stipulated by the relevant regulations.

In addition, the total radiated power TRP generally satisfies the following formula (2).

$$TRP = P + E \tag{2}$$

That is, total radiated power (TRP)=actual mobile phone power (P)+antenna efficiency (E). If the value of the total radiated power (TRP) is higher, which means a radiation performance of the terminal device is better. It may be understood that for the same device, since the antenna efficiency (E) is constant, the radiation performance of the terminal device is better if the actual power (P) of the terminal device is higher.

It may be understood that the actual power P of the terminal device=the maximum power $P_0$+ that the terminal device can support+the fallback power P1'. It may be understood that the maximum power $P_0$ that the terminal device 200 can support is usually set to be greater than or equal to a maximum safety limit of the power spectral density PSD specified by the relevant regulations. Therefore, the fallback power P1' is usually negative, so that the terminal device 200 meets the maximum safety limit of the power spectral density PSD specified by the relevant regulations.

For example, the power spectral density PSD specified by the regulations is used as 17 dB as an example. The antenna gain G of the terminal device 200 in the folded state is 3 dB, and in order to meet the requirements of the regulations, the actual power P of the terminal device 200 needs to be set to 14 dB. In this case, the fallback power P1'=−4 dB is necessarily to be set, so that the terminal device 200 is adjusted from the maximum power $P_0$=18 dB to the actual power P=14 dB. In this case, the total radiated power TRP of the terminal device 200 is 11 dB. Obviously, with reference to Table 1, the margin between the actual power of the terminal device 200 and the regulations is 0, and the terminal device 200 can achieve an optimal performance under the regulations.

For another example, the antenna gain of the terminal device 200 in the unfolded state is 1 dB. In this case, the actual power P of the terminal device 200 is set to 14 dB. In this case, the terminal device 200 in the unfolded state and the device in the folded state perform the same power setting, that is, the fallback power P1'=−4 dB, so that the terminal device 200 is adjusted from the maximum power $P_0$=18 dB to the actual power P=14 dB. Obviously, with reference to Table 1, the margin between the actual power of the terminal device 200 and the regulations is 2 dB, and the terminal device 200 does not achieve an optimal performance under the regulations. Although the total radiated power TRP of the terminal device 200 in this case is 11 dB, which is the same as the performance in the folded state, the total radiated power TRP of the terminal device 200 can reach 13 dB under the premise of complying with regulations.

The embodiment of this application provides a power management method, which can detect the configuration of the terminal device 200, and adjust the transmit power of the terminal device 200 based on the current configuration of the terminal device 200, so that the total radiated power TRP of the terminal device 200 can reach the optimal value under the regulations.

Figures 3, 4:
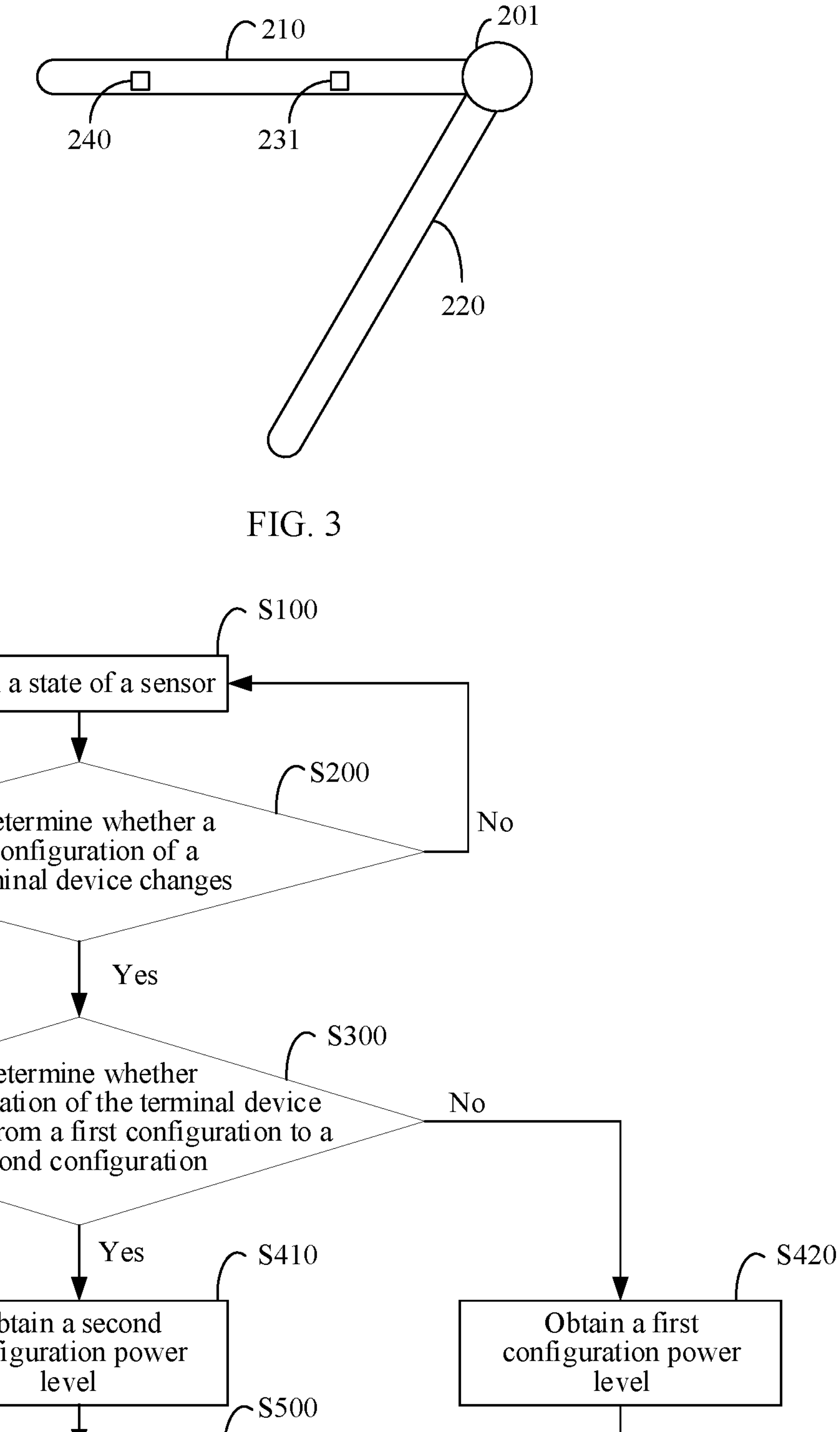
FIG. 3 is a schematic structural diagram of a terminal device according to an embodiment of this application.
FIG. 4 is a schematic flowchart of a power management method according to an embodiment of this application.

FIG. 3 is a schematic structural diagram of a terminal device 201 according to embodiments of this application.

The terminal device 201 in embodiments of this application may also be referred to as a user equipment (User Equipment, UE), an access terminal, a remote terminal, a mobile device, a user terminal, a terminal, a wireless communication device, a user agent, or a user apparatus. Typically, the terminal device 200 may be a mobile phone, a tablet computer, a portable notebook computer, a virtual\hybrid\augmented reality device, a navigation device, a session initiation protocol (Session Initiation Protocol, SIP) phone, a personal digital assistant (Personal Digital Assistant, PDA), a handheld device with communication capabilities, a computing device or another processing device connected to a wireless modem, a vehicle-mounted device, a wearable device, a terminal device in a 5G network, a future evolved public land mobile network (Public Land Mobile Network, PLMN) or another communication system in the future terminal device, or the like.

Referring to FIG. 3, the terminal device 201 includes a first component 210, a second component 220, a first sensor 231, and a processor 240.

An angle between the first component 210 and the second component 220 within the terminal device 201 may vary to adjust the configuration of the terminal device 201 from a first configuration to a second configuration, or from the second configuration to the first configuration. It may be understood that the antenna gain changes when the configuration of the terminal device 201 is adjusted from the first configuration to the second configuration or from the second configuration to the first configuration.

For example, the first component 210 and the second component 220 may be independent components, may be a main screen and a secondary screen, or may be two parts of a flexible screen, which is not limited in this application.

For example, the manner the terminal device 201 changes the configuration includes but is not limited to outer folding, inner folding, sliding cover, flip cover, multi-folding, reel stretching, and the like, which is not limited in this application.

It may be understood that the processor 240 of the terminal device 201 is an application processor (Application Processor, AP). The processor 240 may obtain state information from the first sensor 231 and control the terminal device 201 to adjust the antenna power based on the state information of the first sensor 231.

For example, the first sensor 231 may be a motion sensor, a Hall (Hall) sensor, or another sensor. As a type of the motion sensor, an accelerometer sensor may detect a magnitude of acceleration in various directions (generally three axes), and may detect a magnitude and a direction of gravity when static, which can be configured to identify an angle of the terminal device 201 and a relative displacement between the first component 210 and the second component 220. It may be understood that when the first sensor 231 is the Hall sensor, the Hall sensor can be configured to detect the configuration change of the terminal device 201, and output a corresponding electrical signal based on the first configuration or the second configuration of the terminal device 201, such as 0 or 1. The first sensor 231 may further include a pressure sensor, a gyroscope, a barometer, an infrared sensor, and the like, which are not described herein in detail.

For example, when the first sensor 231 is the Hall sensor, the terminal device 201 may be detected in the first configuration or the second configuration. When the configuration of the terminal device 201 is changed, the state information is outputted. For example, if the terminal device 201 is in the first configuration, 0 is outputted, and if the terminal device 201 is in the second configuration, 1 is outputted, which are not limited in this application.

For example, when the first sensor 231 is the accelerometer sensor, it can detect the magnitude of the acceleration in each direction of the terminal device 201, and obtain the relative displacement and the angle between the first component 210 and the second component 220, so as to obtain the current state of the terminal device 201 is the first configuration or the second configuration, and output the state information corresponding to the state.

For example, the first configuration may be the unfolded state or the folded state, and the second configuration may be the folded state or the unfolded state, which is not limited in this application.

It may be understood that the first sensor 231 does not output the state information when the unfolding angle of the terminal device 201 is between the first configuration and the second configuration, so as to avoid adjusting the actual power before the terminal device 201 is not completed in the configuration of switching, resulting in a case where the power of the terminal device 201 is higher than the regulatory limit.

Referring to FIG. 4 together, FIG. 4 is a schematic flowchart of a power management method according to an embodiment of this application.

The power management method provided by the embodiment of this application is described below by taking the terminal device 201 as an example. The power management method includes the following steps.

S100: Obtain a state of the sensor.

It may be understood that the state information from the first sensor 231 is obtained.

S200: Determine whether a state of the terminal device changes.

It may be understood that the state of the terminal device 201 is determined to change based on the state information of the first sensor 231.

It may be understood that if the state of the terminal device 201 does not change, the process returns to step S200 to continue monitoring whether the configuration of the terminal device 201 changes, and the actual power of the antenna of the terminal device 201 can be adjusted in time when the configuration changes. If the state of the terminal device 201 is changed, step S300 is performed to continue to determine the current configuration of the terminal device 201.

S300: Determine whether the configuration of the terminal device is changed from the first configuration to the second configuration.

It may be understood that, after obtaining the change of the configuration of the terminal device 201, it is further determined whether the configuration of the terminal device 201 is changed from the first configuration to the second configuration. It may be understood that the first sensor 231 only generates the state information when the terminal device 201 switches from the first configuration to the second configuration, or switches from the second configuration to the first configuration, so if the terminal device 201 is not the second configuration, the terminal device is the first configuration. If the configuration of the terminal device 201 is changed from the first configuration to the second configuration, step S410 is performed. If the configuration of the terminal device 201 is changed from the second configuration to the first configuration, step S420 is performed.

S410: Obtain a fallback power of the second configuration.

It may be understood that, if the current configuration of the terminal device 201 is the second configuration, a preset output power level truth table is searched based on the second configuration.

The matching mechanism of the truth table is described below in conjunction with Table 2.

TABLE 2

Output power level truth table of the terminal device 201

| Terminal device configuration | Power level | Fallback power |
|---|---|---|
| First configuration | 1 | P1 |
| Second configuration | 2 | P2 |

It may be understood that the output power level truth table is stored in the application processor 240. The preset power level and the fallback power in the truth table are set based on the antenna gain of the terminal device 201 in different configurations. Specifically, the output power corresponding to the fallback power is the maximum power that the terminal device 201 meets the regulatory requirements in the current configuration.

It may be understood that the application processor 240 matches the power level corresponding to the terminal device 201 based on the current configuration. When the application processor 240 obtains the configuration of the terminal device 201 is the second configuration, the application processor searches the table and obtains the power level corresponding to the second configuration as 2.

It may be understood that, after the application processor 240 obtains the power level corresponding to the second configuration is 2, the application processor continues to obtain the corresponding fallback power P2, and controls the terminal device 201 to set the fallback power to P2.

For example, that the maximum power $P_0$ supported by the terminal device 201 is 18 dB, the fallback power P1 is −3 dB, and the fallback power P2 is −6 dB is used as an example. When the first sensor 231 detects that the terminal device 201 is in the first configuration, the output power level truth table is used for obtaining that the level of the terminal device 201 is 1, the fallback power is P1, and the output power of terminal device 201 is adjusted to $P_0+P1=18+(-3)=15$ dB, so that the terminal device 201 can reach the maximum power that meets the regulatory requirements in the first configuration.

S420: Obtain a first configuration power level.

It may be understood that, if the current configuration of the terminal device 201 is the first configuration, the truth table is searched based on the first configuration.

It may be understood that, after the application processor 240 obtains the power level corresponding to the first configuration is 1, the application processor continues to obtain the corresponding fallback power P1, and controls the terminal device 201 to set the fallback power to P1.

S500: Output a corresponding power value.

It may be understood that the terminal device 201 sets the output power of the terminal device 201 based on the obtained fallback power P1 or P2.

It may be understood that the use of the power management method provided by embodiments of this application can enable the terminal device 201 to achieve the maximum transmit power under regulatory conditions in different configurations, and improve the total radiated power of the terminal device 201.

It may be understood that, in some embodiments, when the terminal device 201 switches to the first configuration or the second configuration, a built-in software system generates the corresponding configuration information. The application processor 240 may obtain the current configuration of the terminal device 201 by reading configuration information in the software system, and reads the truth table based on the current configuration of the terminal device 201.

It may be understood that the power management method provided by embodiments of this application can be applied to a communication manner where relevant regulations limit the transmission power, such as Wi-Fi, a cellular network, NFC, Bluetooth, GPS, and Beidou.

Figure 5:
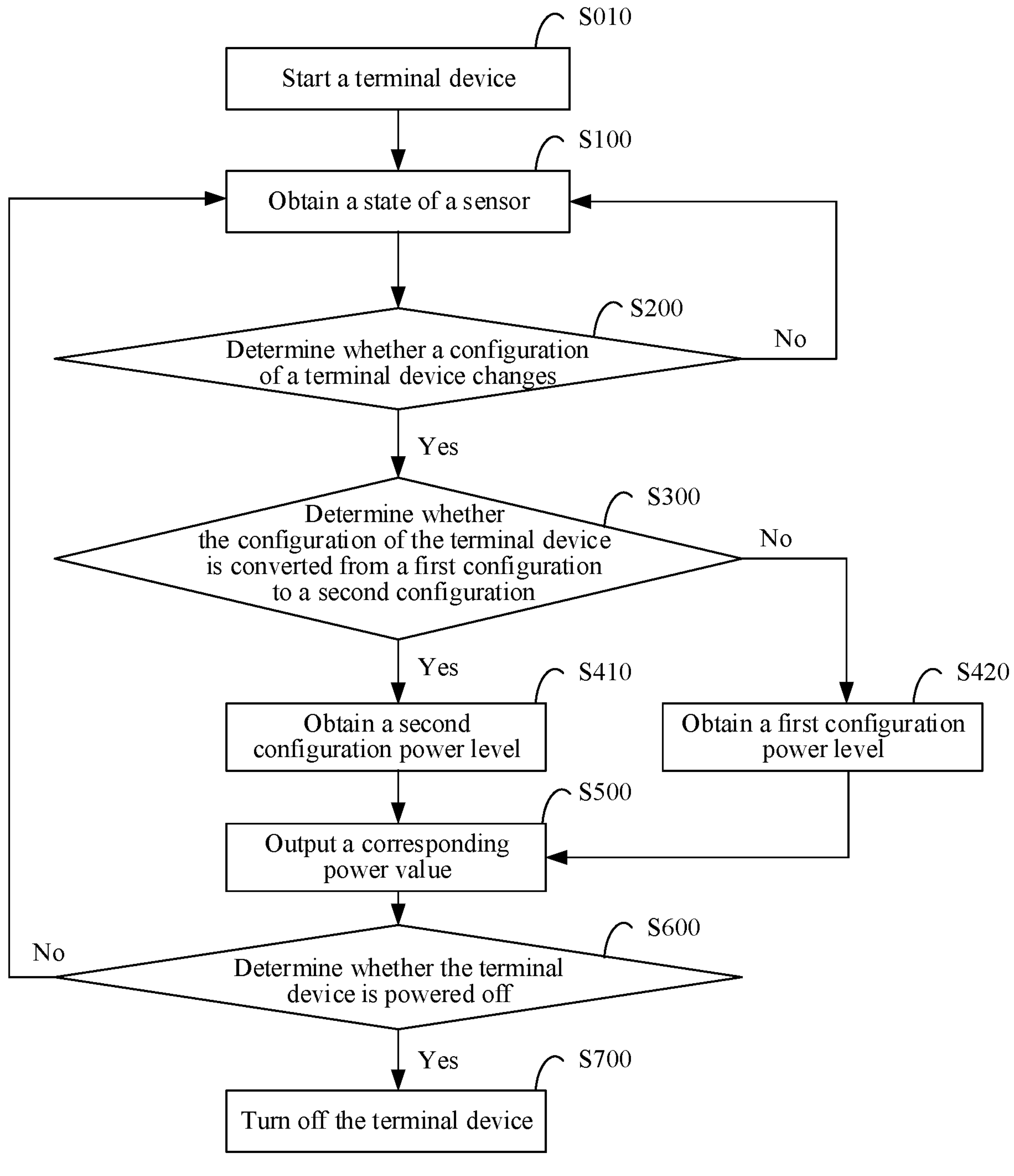
FIG. 5 is a schematic flowchart of a power management method according to another embodiment of this application.

FIG. 5 is a schematic flowchart of a power management method according to another embodiment of this application.

It may be understood that step S100 to step S500 in the power management method shown in FIG. 5 are the same as step S100 to step S500 in FIG. 4, which are not described herein in detail.

It may be understood that, compared with FIG. 4, the power management method shown in FIG. 5 further includes the following steps.

S010: The terminal device is powered on.

It may be understood that the application processor 240 detects whether the terminal device 201 is in a power-on state, and if the terminal device 201 is turned on, the state of the first sensor 231 is continuously detected, that is, step S200 is performed.

S600: Determine whether the terminal device is turned off.

It may be understood that the application processor also monitors whether the terminal device 201 has performed a shutdown operation when the application processor 240 monitors the state of the first sensor 231. If the terminal device 201 has performed the shutdown operation, step S700 is performed. If it is determined that the terminal device 201 does not perform the shutdown operation, the process returns to step S200 to continue monitoring the terminal device.

S700: Turn off the terminal device.

It may be understood that the terminal device 201 is controlled to complete the shutdown operation when the application processor 240 detects that the terminal device 201 performs the shutdown operation. That is, the performing of the power management method is stopped.

It may be understood that the power management method shown in FIG. 5 adds a switch detection function. Obviously, after the switch detection function is added, the application processor 240 may continue to monitor the state of the first sensor 231 after the terminal device 201 is turned on, to monitor the configuration of the terminal device 201 throughout the whole process after the startup.

Figure 6:
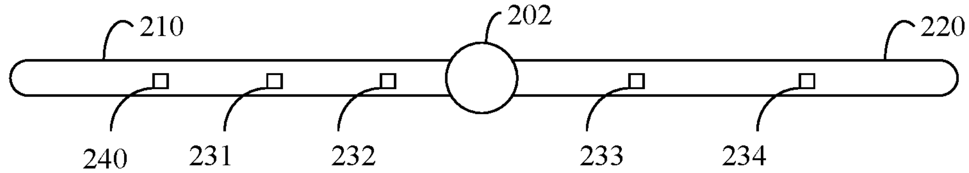
FIG. 6 is a schematic structural diagram of a terminal device according to another embodiment of this application.

FIG. 6 is a schematic structural diagram of a terminal device 202 according to embodiments of this application.

Referring to FIG. 6, compared with FIG. 3, the terminal device 202 further includes a second sensor 232, a third sensor 233 and a fourth sensor 234.

It may be understood that the first sensor 231 and the second sensor 232 are arranged on the first component 210, to detect acceleration and gravity of the first component 210.

For example, the first sensor 231 and the second sensor 232 may be the motion sensor or another sensor. As a type of the motion sensor, an accelerometer sensor may detect a magnitude of acceleration in various directions (generally three axes), and may detect a magnitude and a direction of gravity when static, which can be configured to identify the angle of the terminal device 202 and the displacement and the angle of the first component 210. The first sensor 231 and the second sensor 232 may further include a pressure sensor, a gyroscope, a barometer, an infrared sensor, and the like, which are not described herein in detail.

It may be understood that the third sensor 233 and the fourth sensor 234 are arranged on the second component 220, to detect acceleration and gravity of the first component 210.

For example, the third sensor 233 and the fourth sensor 234 may be the motion sensor or another sensor. As a type of the motion sensor, an accelerometer sensor may detect a magnitude of acceleration in various directions (generally three axes), and may detect a magnitude and a direction of gravity when static, which can be configured to identify the angle of the terminal device 202 and the displacement and the angle of the second component 220. The third sensor 233 and the fourth sensor 234 may further include a pressure sensor, a gyroscope, a barometer, an infrared sensor, and the like, which are not described herein in detail.

It may be understood that, after obtaining the magnitude and the direction of the gravity of the first component 210 and the second component 220, a Cartesian coordinate system can be established on the first component 210 and the second component 220, respectively, and the included angle between the first component 210 and the second component 220 can be calculated based on the Cartesian coordinate system.

It may be understood that, after calculating the included angle between the first component 210 and the second component 220, the power of the terminal device 202 is adjusted based on the antenna gain corresponding to the included angle of the terminal device 202.

Figure 7:
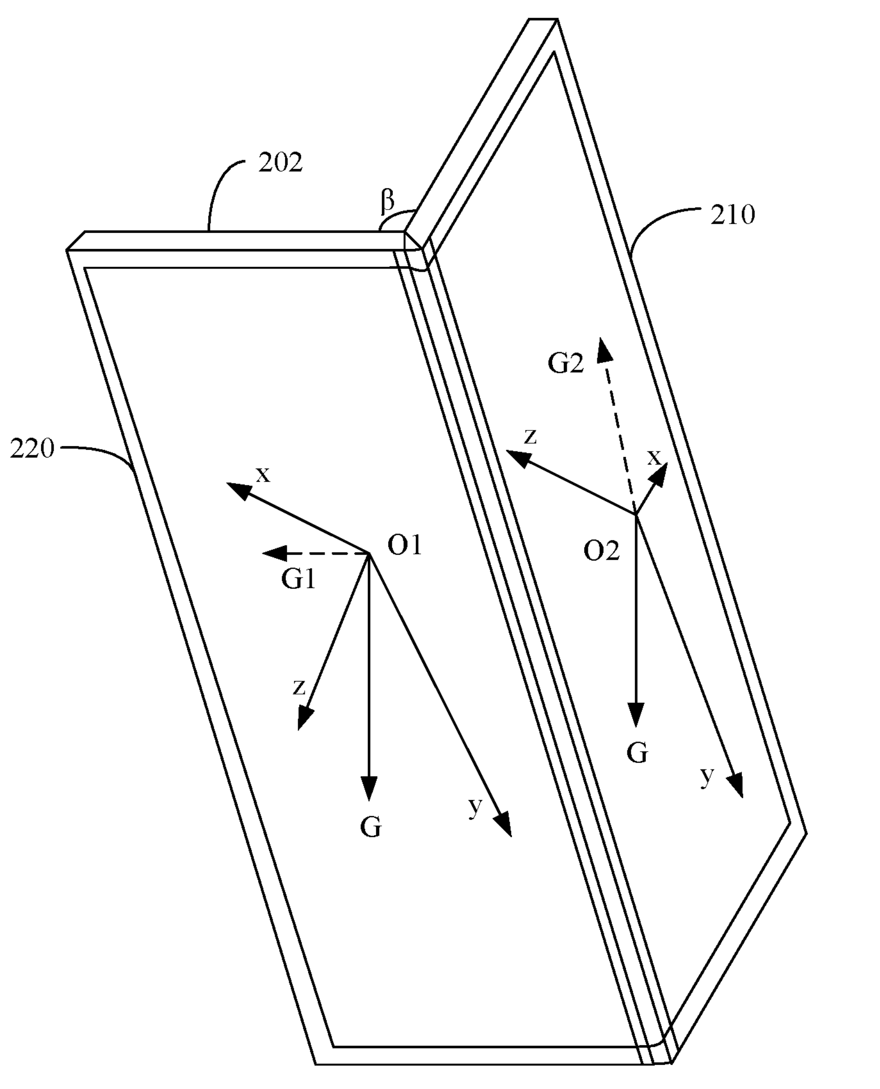
FIG. 7 is a schematic structural diagram of a terminal device according to another embodiment of this application.

Referring to FIG. 7 together, the terminal device 202 in FIG. 7 further shows directions of a Cartesian coordinate system O1, a Cartesian coordinate system O2, and gravity G.

For example, corresponding coordinate systems may be provided on the first component 210 and the second component 220, respectively. For example, the Cartesian coordinate system O1 may be provided in the second component 220. An x-axis is parallel to a short side of the second component 220, a y-axis is parallel to a long side of the second component 220, and a z-axis points outward relative to the second component 220 perpendicularly to a plane composed of the x-axis and the y-axis in the Cartesian coordinate system O1. Similarly, the Cartesian coordinate system O2 may be provided in the first component 210. The x-axis is parallel to a short side of the first component 210, the y-axis is parallel to a long side of the first component 210, and the z-axis points inward relative to the first component 210 perpendicularly to the plane composed of the x-axis and the y-axis in the Cartesian coordinate system O2.

For example, the third sensor 233 and the fourth sensor 234 in the second component 220 may detect the magnitude and the direction of the gravity G in the Cartesian coordinate system O1, and the first sensor 231 and the second sensor 232 in the first component 210 can detect the magnitude and the direction of the gravity G in the Cartesian coordinate system O2. Since the direction of the y-axis in the Cartesian coordinate system O1 and the Cartesian coordinate system O2 is the same, a component G1 of the gravity G on the x-axis and z-axis planes in the Cartesian coordinate system O1 is equal in magnitude but different in direction from the component G2 of the gravity G on the x-axis and z-axis planes in the Cartesian coordinate system O2. In this case, an included angle between the component G1 and the component G2 is $\beta$, and the included angle $\alpha=360°-\beta$ between the second component 220 and the first component 210.

It may be understood that the electronic device 200 obtains the included angle $\alpha$ between the second component 220 and the first component 210 by calculating the included angle $\beta$ between the component G1 of the gravity G in the Cartesian coordinate system O1 and the component G2 of the gravity G in the Cartesian coordinate system O2.

In some other embodiments, as shown in FIG. 7, since the direction of the y-axis in the Cartesian coordinate system O1 and the Cartesian coordinate system O2 is the same, the included angle between the x-axis in the Cartesian coordinate system O1 and the x-axis in the Cartesian coordinate system O2 is also equal to p. That is to say, the terminal device 202 can also detect the included angle $\beta$ between the x-axis in the Cartesian coordinate system O1 and the x-axis in the Cartesian coordinate system O2, and then calculate the included angle $\alpha=360°-\beta$ between the second component 220 and the first component 210.

For example, when the terminal device 202 of the second component 220 and the first component 210 move inward, the included angle $\alpha$ between the second component 220 and the first component 210 may vary within a closed interval composed of 0° to 180°. For example, when the terminal device 200 of the second component 220 and the first component 210 move outward, the included angle $\alpha$ between the second component 220 and the first component 210 may vary within a closed interval composed of 180° to 360°. Alternatively, the included angle $\alpha$ between the second component 220 and the first component 210 may also vary within a closed interval composed of 0° to 360°, which is not limited in this embodiment of this application.

For example, the angle values of the included angle between the first component 210 and the second component 220 are respectively obtained at a plurality of sampling time points in a preset time period. If one angle value of the included angle between the first component 210 and the second component 220 can be obtained at one sampling time point, a plurality of angle values of the included angle between the first component 210 and the second component 220 can be obtained at a plurality of sampling time points. The plurality of angle values are obtained to accurately determine the angle value between the first component 210 and the second component 220.

It should be noted that if the terminal device 202 includes three or more components, the angle value of the included angle of the terminal device 202 includes the angle value of the included angle between all adjacent two components. For example, if the terminal device 202 includes three components, the angle value of the included angle of the terminal device 202 includes an angle value of the included angle between the first component 210 and the second component 220, and an angle value of the included angle between the second component 220 and the third component, which are not enumerated here.

Figure 8:
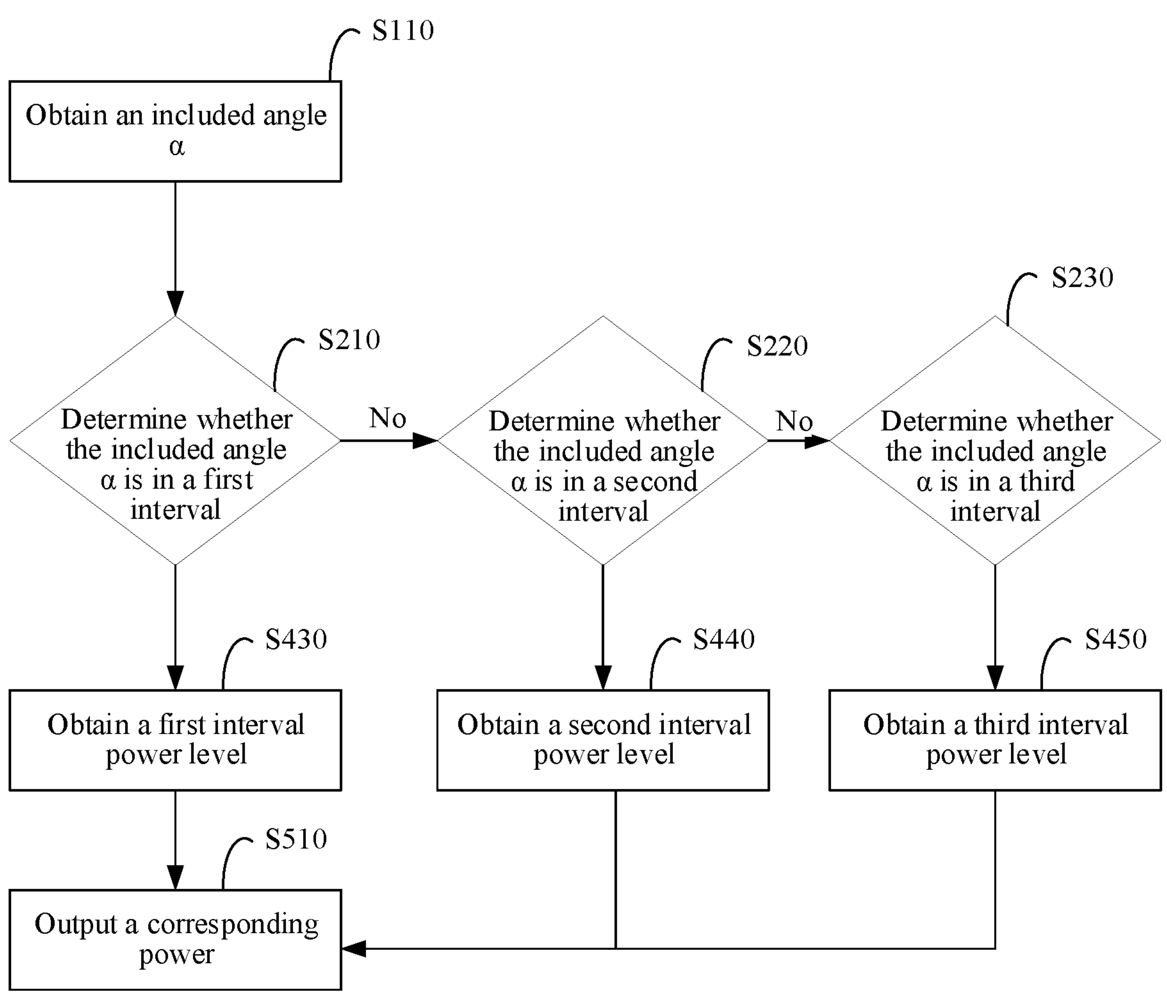
FIG. 8 is a schematic flowchart of a power management method according to another embodiment of this application.

FIG. 8 is a schematic flowchart of a power management method according to another embodiment of this application.

The power management method provided by the embodiment of this application is described below by taking the terminal device 202 as an example. The power management method includes the following steps.

S110: Obtain the included angle α.

It may be understood that the application processor 240 obtains the included angle α between the first component 210 and the second component 220 calculated based on the Cartesian coordinate system O1 and the Cartesian coordinate system O2.

It may be understood that the calculation manner of the included angle α between the first component 210 and the second component 220 is the same as that shown in FIG. 6. Details are not described herein again.

S210: Determine whether the included angle α is in a first interval.

It may be understood that the application processor 240 determines whether the included angle α is in the first interval after obtaining the included angle α. If the included angle α is in the first interval, step S430 is performed to match the power of the terminal device 202 to a first interval truth table.

S220: Determine whether the included angle α is in a second interval.

It may be understood that the application processor 240 determines whether the included angle α is in the second interval after obtaining the included angle α. If the included angle α is in the second interval, step S440 is performed to match the power of the terminal device 202 to a second interval truth table.

S230: Determine whether the included angle α is in a third interval.

It may be understood that the application processor 240 determines whether the included angle α is in the third interval after obtaining the included angle α. If the included angle α is in the third interval, step S450 is performed to match the power of the terminal device 202 to a third interval truth table.

It may be understood that the power management method shown in FIG. 8 sets three different intervals based on the included angle α. The antenna gain of the terminal device 202 is different in each interval, and the transmit power of the terminal device 202 at different unfolding angle intervals can be optimized by using the power management method provided by the embodiment of this application, so that the terminal device 202 has a higher total radiated power.

It may be understood that the power management method provided by the embodiment of this application can set different included angle intervals based on the antenna gain of the terminal device 202 at different unfolding angles. For example, two, four, or more included angle intervals may be arranged, which is not limited in this application.

In combination with Table 3, parameters of the terminal device 202 at different unfolding angles are described below.

TABLE 3

Parameters of the terminal device 202 at different unfolding angles

| Device angle | $P_0$ | G | PSD | P1' | P | P + G | PSD − (P + G) | E | TRP |
|---|---|---|---|---|---|---|---|---|---|
| First interval | 18 | 3 | 17 | −4 | 14 | 17 | 0 | −3 | 11 |
| Second interval | 18 | 2.5 | 17 | −3.5 | 14.5 | 17 | 0 | −3 | 11.5 |
| Third interval | 18 | 2 | 17 | −3 | 15 | 17 | 0 | −3 | 12 |
| . . . | . . . | . . . | . . . | . . . | . . . | . . . | . . . | . . . | . . . |
| Nth interval | 18 | 0.5 | 17 | −1.5 | 16.5 | 17 | 0 | −3 | 13.5 |

It may be understood that the parameter explanation and units in Table 3 refer to Table 1. Details are not described herein again. As shown in Table 3, the application processor 240 can adjust the actual power of the terminal device 202 based on the antenna gain change when the terminal device 202 is in different angle intervals, and may have a higher total radiated power if the regulations are met.

It may be understood that if the antenna gain in the interval where the terminal device 202 is located is a range value, the maximum antenna gain within the range value is taken to set the actual power to avoid the power spectral density of terminal device 202 from exceeding the regulatory limit.

For example, if the unfolding angle of the terminal device 202 is in the second interval, and the antenna gain of the terminal device 202 when in the second interval is 2.5 dB to 2.2 dB, the antenna gain of 2.5 dB is taken to calculate the actual power when calculating the maximum value of the actual power, to obtain the actual power of 14.5 dB. It may be understood that the actual power is 14.7 dB if the antenna gain is 2.2 dB. When the terminal device 202 is in a region adjacent to the first interval in the second interval, the terminal device may exceed the power spectral density specified by the regulations.

S430: Obtain a first interval power level.

It may be understood that the application processor 240 stores the output power level truth table.

TABLE 4

Output power level truth table of the terminal device 202

| Angle interval of the terminal device | Power level | Fallback power |
|---|---|---|
| First interval | 1 | P1 |
| Second interval | 2 | P2 |
| Third interval | 3 | P3 |
| . . . | . . . | . . . |
| Nth interval | N | PN |

It may be understood that, referring to FIG. 7 and FIG. 2, the application processor 240 performs the same manner as in FIG. 7 and Table 2 for matching the truth table after obtaining the included angle interval. Details are not described herein again.

It may be understood that the application processor 240 obtains the first interval power level, and reads the corresponding fallback power based on the first interval level.

S440: Obtain a second interval power level.

It may be understood that, referring to FIG. 7 and FIG. 2, the application processor 240 performs the same manner as in FIG. 7 and Table 2 for matching the truth table after obtaining the included angle interval. Details are not described herein again.

It may be understood that the application processor 240 obtains the second interval power level, and reads the corresponding fallback power based on the second interval level.

S450: Obtain a third interval power level.

It may be understood that, referring to FIG. 7 and FIG. 2, the application processor 240 performs the same manner as in FIG. 7 and Table 2 for matching the truth table after obtaining the included angle interval. Details are not described herein again.

It may be understood that the application processor 240 obtains the third interval power level, and reads the corresponding fallback power based on the third interval level.

S510: Output a corresponding power.

It may be understood that the application processor 240 adjusts the output power of the terminal device 202 based on the corresponding fallback level, to optimize the total radiated power of the terminal device 202 within the range specified by the regulations and the communication performance of the terminal device 202.

It may be understood that, similar to the embodiment in FIG. 5, the power management method shown in FIG. 8 may further include a switch detection. For details, reference may be made steps S010, S600, and S700 in FIG. 5, which are not described herein in detail.

It may be understood that the power management method provided by embodiments of this application can be applied to a communication manner where relevant regulations limit the transmission power, such as Wi-Fi, a cellular network, NFC, Bluetooth, GPS, and Beidou.

It may be understood that, when the terminal device 201 and the terminal device 202 have different communication modes and the different communication modes have limits on the transmit power, the power management method provided by embodiments of this application can consider the transmission power limits of different regulations for different or the same communication manners.

The power management mechanism under different regulations is described below in conjunction with Table 5.

TABLE 5

Truth table of power management methods under different regulations

| Terminal device configuration | First regulation power limit | Second regulation power limit | Maximum power limit of the terminal device |
|---|---|---|---|
| First configuration | P1 | P2 | Min (P1, P2) |
| Second configuration | P3 | P4 | Min (P3, P4) |

It may be understood that, taking an example that terminal device 201 or the terminal device 202 needs to satisfy both regulations, when the terminal device 201 or terminal device 202 is in the first configuration, the first regulation power limit (P1) and the second regulation power limit (P2) are obtained, and a smaller value of the first regulation power limit (P1) and the second regulation power limit (P2) is a highest power limit of the terminal device 201 or the terminal device 202.

It may be understood that, when the terminal device 201 or the terminal device 202 is in the second configuration, a smaller value of the third regulation power limit (P3) and the fourth regulation power limit (P4) is a maximum power limit of the terminal device 201 or the terminal device 202.

An embodiment of this application further provides a storage medium configured to store a computer program. When the computer program is executed by the processor, the power management method shown in step S200 to step S500 in FIG. 4, step S010 to step S700 in FIG. 5, and step S110 to step S610 in FIG. 8 provided by the embodiment of this application is realized.

The storage medium includes volatile and nonvolatile media, and removable and non-removable media implemented by using any method or technology used for storing information (such as computer readable instructions, data structures, program modules, or other data). The storage medium includes but are not limited to a random access memory (Random Access Memory, RAM), a read-only memory (Read-Only Memory, ROM), an electrically erasable programmable read-only memory (Electrically Erasable Programmable Read-Only Memory, EEPROM), a flash memory or another memory, a compact disc read-only memory (Compact Disc Read-Only Memory, CD-ROM), a digital versatile disc (Digital Versatile Disc, DVD) or another optical disk storage, magnetic cassette, magnetic tape, magnetic disk storage or another magnetic storage apparatus, or any other medium that can be used for storing desired information and can be accessed by a computer.

Figure 9:
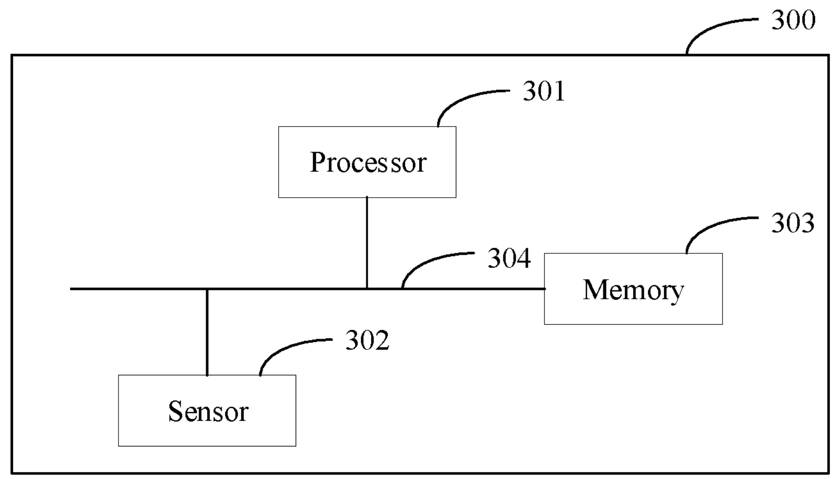
FIG. 9 is a schematic structural diagram of a terminal device according to another embodiment of this application.

FIG. 9 is a terminal device 300 according to another embodiment of this application. As shown in FIG. 9, the terminal device 300 includes a sensor 302, a processor 301, a memory 303, and a connection module 304.

It may be understood that the sensor 302, the processor 301, and the memory 303 are all connected through the connection module 304. It may be understood that the sensor 302 is configured to obtain the configuration information or the angle information of the terminal device 300 and transmit the information to the processor 301 through the connection module 302. The processor 301 obtains the power management method truth table based on the memory 303, and matches the power level and the fallback power in the power management method truth table based on the configuration information or the angle information of the terminal device 300. It may be understood that reference may be made to FIG. 4, FIG. 5, and FIG. 8 together for the manner of matching the power level and the fallback power in the power management method truth table based on the configuration information or the angle information, which are not described herein in detail.

A person skilled in the art should recognize that the above embodiments are only used for illustrating this application, and are not intended to limit this application. Appropriate changes and variations made to the above embodiments fall within the scope of protection claimed by this application as long as the changes and variations are within the essential spirit of this application.

What is claimed is:

1. A method, applied to a foldable terminal device, the method comprising:

obtaining a configuration change signal of the foldable terminal device in response to a configuration change of the foldable terminal device;

obtaining an output power level truth table of the foldable terminal device based on the configuration change signal of the foldable terminal device, wherein the output power level truth table comprises a configuration of the foldable terminal device and a power level and a fallback power of the foldable terminal device in the configuration;

obtaining the power level and the fallback power of the foldable terminal device based on the output power level truth table;

setting an output power of the foldable terminal device based on the fallback power of the foldable terminal device, wherein the output power is a maximum power that meets regulatory requirements in a current configuration; and outputting a corresponding power value based on the power level.

2. The method according to claim 1, wherein the corresponding power value is a difference between a power spectral density and an antenna gain of the foldable terminal device.

3. The method according to claim 1, wherein the obtaining a configuration change signal of the foldable terminal device in response to a configuration change of the foldable terminal device comprises:

obtaining a state of a foldable sensor configured to sense the foldable terminal device;

determining, based on the state of the sensor, whether the configuration of the foldable terminal device changes;

obtaining the configuration of the foldable terminal device when it is determined that the configuration of the foldable terminal device changes; and generating the configuration change signal.

4. The method according to claim 3, the method further comprising:

detecting whether the foldable terminal device is in a power-on state; and obtaining the state of the sensor when the foldable terminal device is in the power-on state.

5. The method according to claim 3, wherein the obtaining the power level of the foldable terminal device based on the configuration change signal of the foldable terminal device comprises:

obtaining the current configuration of the foldable terminal device and a maximum power supported by the foldable terminal device; and performing fallback on the maximum power supported by the foldable terminal device based on the fallback power, so that the output power of the foldable terminal device reaches the maximum power that meets the regulatory requirements.

6. A method, applied to a foldable terminal device, the method comprising:

obtaining an angle of the foldable terminal device in response to an angle change between a main screen and a secondary screen of the foldable terminal device, and matching the angle of the foldable terminal device to an angle interval;

obtaining an output power level truth table of the foldable terminal device based on the angle interval of the foldable terminal device, wherein the output power level truth table comprises the angle interval of the foldable terminal device and a power level and a fallback power of the foldable terminal device when the foldable terminal device is in the angle interval;

obtaining the power level and the fallback power of the foldable terminal device based on the output power level truth table;

setting an output power of the foldable terminal device based on the fallback power of the foldable terminal device, wherein the output power is a maximum power that meets regulatory requirements in a current configuration; and outputting a corresponding power value based on the power level of the foldable terminal device.

7. The method according to claim 6, wherein the angle interval comprises at least three intervals, and the matching the angle of the foldable terminal device to an angle interval comprises:

determining whether the angle of the foldable terminal device is in a first interval;

matching the output power level truth table based on the first interval when the angle of the foldable terminal device is in the first interval;

further determining whether the angle of the foldable terminal device is in a second interval when the angle of the foldable terminal device is not in the first interval;

matching the output power level truth table based on the second interval when the angle of the foldable terminal device is in the second interval;

further determining whether the angle of the foldable terminal device is in a third interval when the angle of the foldable terminal device is not in the second interval; and matching the output power level truth table based on the third interval when the angle of the foldable terminal device is in the third interval.

8. The method according to claim 6, wherein the corresponding power value is a difference between a power spectral density and an antenna gain of the foldable terminal device.

9. The method according to claim 6, the method further comprising:

detecting whether the foldable terminal device is in a power-on state; and obtaining the angle interval of the foldable terminal device when the foldable terminal device is in the power-on state.

10. The method according to claim 6, wherein the obtaining an angle interval of the foldable terminal device in response to an angle change between a main screen and a secondary screen of the foldable terminal device comprises:

obtaining acceleration and gravity of the main screen and the secondary screen of the foldable terminal device;

establishing a Cartesian coordinate system based on the acceleration and the gravity of the main screen and the secondary screen of the foldable terminal device;

obtaining an angle between the main screen and the secondary screen of the foldable terminal device based on the Cartesian coordinate system; and generating an angle change signal when the angle between the main screen and the secondary screen of the foldable terminal device changes.

11. The method according to claim 10, wherein the obtaining the power level of the foldable terminal device based on the angle interval of the foldable terminal device comprises:

obtaining a current angle interval of the foldable terminal device and a maximum power supported by the foldable terminal device; and performing fallback on the maximum power supported by the foldable terminal device based on the fallback power, so that the output power of the foldable terminal device reaches the maximum power that meets the regulatory requirements.

12. A foldable terminal device, comprising one or more processors, coupled to one or more sensors, wherein:

the one or more sensors are configured to obtain a configuration change of the foldable terminal device;

the one or more processors are configured to, based on a configuration change signal of the foldable terminal device obtained by the one or more sensors, enable the foldable terminal device to perform operations comprising:

obtaining a configuration change signal of the foldable terminal device in response to the configuration change of the foldable terminal device;

obtaining an output power level truth table of the foldable terminal device based on the configuration change signal of the foldable terminal device, wherein the output power level truth table comprises a configuration of the foldable terminal device and a power level and a fallback power of the foldable terminal device in the configuration;

obtaining the power level and the fallback power of the foldable terminal device based on the output power level truth table;

setting an output power of the foldable terminal device based on the fallback power of the foldable terminal device, wherein the output power is a maximum power that meets regulatory requirements in a current configuration; and outputting a corresponding power value based on the power level.

13. The foldable terminal device according to claim 12, wherein the corresponding power value is a difference between a power spectral density and an antenna gain of the foldable terminal device.

14. The foldable terminal device according to claim 12, wherein the obtaining a configuration change signal of a foldable terminal device in response to a configuration change of the foldable terminal device comprises:

obtaining a state of a foldable sensor configured to sense the foldable terminal device;

determining, based on the state of the sensor, whether the configuration of the foldable terminal device changes;

obtaining the configuration of the foldable terminal device when it is determined that the configuration of the foldable terminal device changes; and generating the configuration change signal.

15. The foldable terminal device according to claim 14, wherein the obtaining the power level of the foldable terminal device based on the configuration change signal of the foldable terminal device comprises:

obtaining the current configuration of the foldable terminal device and a maximum power supported by the foldable terminal device; and performing fallback on the maximum power supported by the foldable terminal device based on the fallback power, so that the output power of the foldable terminal device reaches the maximum power that meets the regulatory requirements.

16. A foldable terminal device, comprising one or more processors, coupled to one or more sensors, wherein:

the one or more sensors are configured to obtain an angle of the foldable terminal device;

the one or more processors are configured to, based on an angle interval of the foldable terminal device obtained by the one or more sensors, enable the foldable terminal device to perform operations comprising:

obtaining an angle of the foldable terminal device in response to an angle change between a main screen and a secondary screen of the foldable terminal device, and matching the angle of the foldable terminal device to an angle interval;

obtaining an output power level truth table of the foldable terminal device based on the angle interval of the foldable terminal device, wherein the output power level truth table comprises the angle interval of the foldable terminal device and a power level and a fallback power of the foldable terminal device when the foldable terminal device is in the angle interval;

obtaining the power level and the fallback power of the foldable terminal device based on the output power level truth table;

setting an output power of the foldable terminal device based on the fallback power of the foldable terminal device, wherein the output power is a maximum power that meets regulatory requirements in a current configuration; and outputting a corresponding power value based on the power level of the foldable terminal device.

17. The foldable terminal device according to claim 16, wherein the angle interval comprises at least three intervals, and the matching the angle of the foldable terminal device to an angle interval comprises:

determining whether the angle of the foldable terminal device is in a first interval;

matching the output power level truth table based on the first interval when the angle of the foldable terminal device is in the first interval;

determining whether the angle of the foldable terminal device is in a second interval when the angle of the foldable terminal device is not in the first interval;

matching the output power level truth table based on the second interval when the angle of the foldable terminal device is in the second interval;

determining whether the angle of the foldable terminal device is in a third interval when the angle of the foldable terminal device is not in the second interval; and matching the output power level truth table based on the third interval when the angle of the foldable terminal device is in the third interval.

18. The foldable terminal device according to claim 16, wherein the corresponding power value is a difference between a power spectral density and an antenna gain of the foldable terminal device.

19. The foldable terminal device according to claim 16, wherein the obtaining an angle interval of the foldable terminal device in response to an angle change between a main screen and a secondary screen of the foldable terminal device comprises:

obtaining acceleration and gravity of the main screen and the secondary screen of the foldable terminal device;

establishing a Cartesian coordinate system based on the acceleration and the gravity of the main screen and the secondary screen of the foldable terminal device;

obtaining an angle between the main screen and the secondary screen of the foldable terminal device based on the Cartesian coordinate system; and generating an angle change signal when the angle between the main screen and the secondary screen of the foldable terminal device changes.

20. The foldable terminal device according to claim 19, wherein the obtaining the power level of the foldable terminal device based on the angle interval of the foldable terminal device comprises:

obtaining a current angle interval of the foldable terminal device and a maximum power supported by the foldable terminal device; and performing fallback on the maximum power supported by the foldable terminal device based on the fallback power, so that the output power of the foldable terminal device reaches the maximum power that meets the regulatory requirements.

* * * * *